May 18, 1954  S. H. BELL  2,678,828
TILT-DECREASING ASSEMBLY
Filed Jan. 10, 1952  3 Sheets-Sheet 1
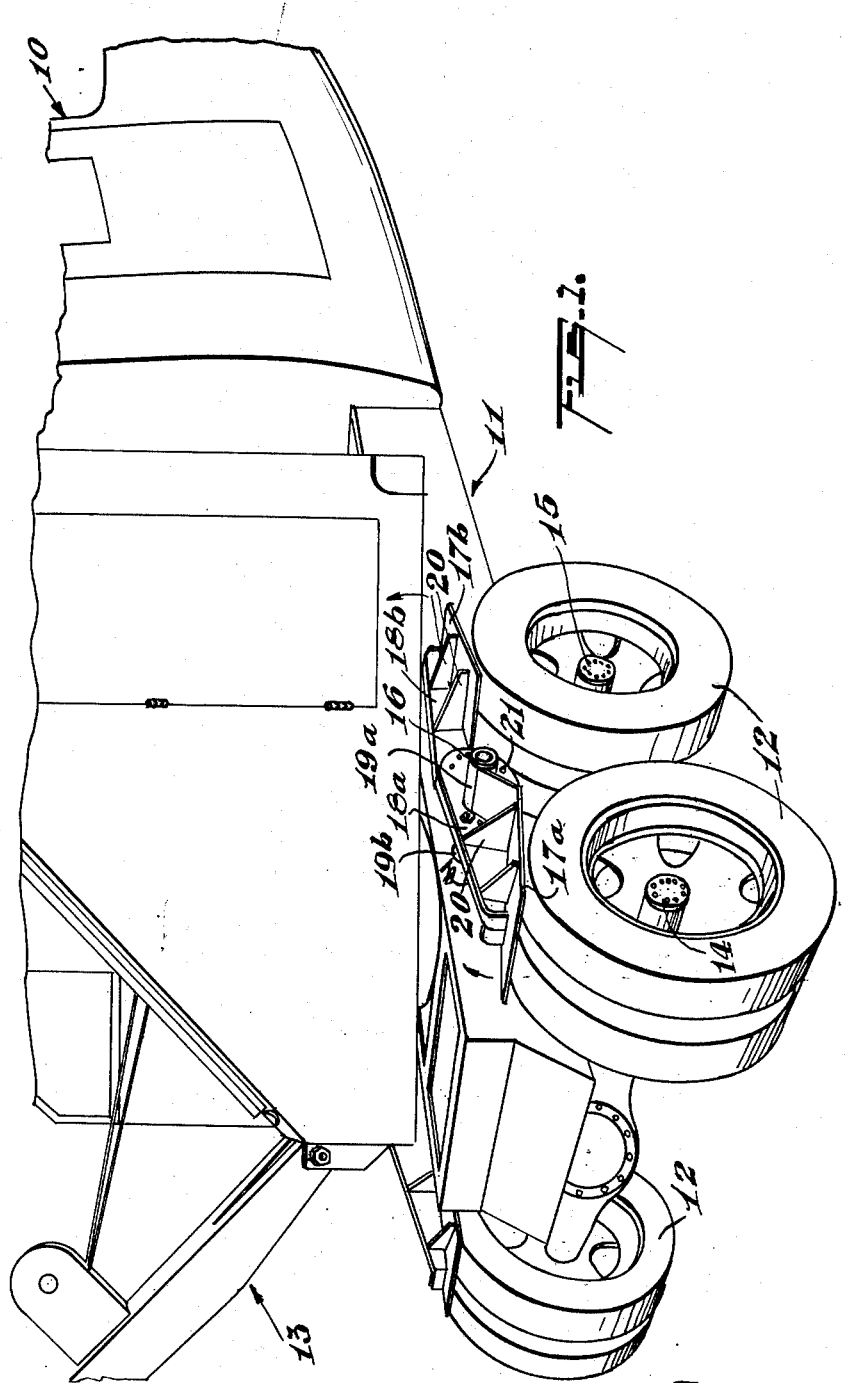
INVENTOR.
STUART H. BELL.
BY Fetherstonhaugh+Co.
ATTORNEYS.

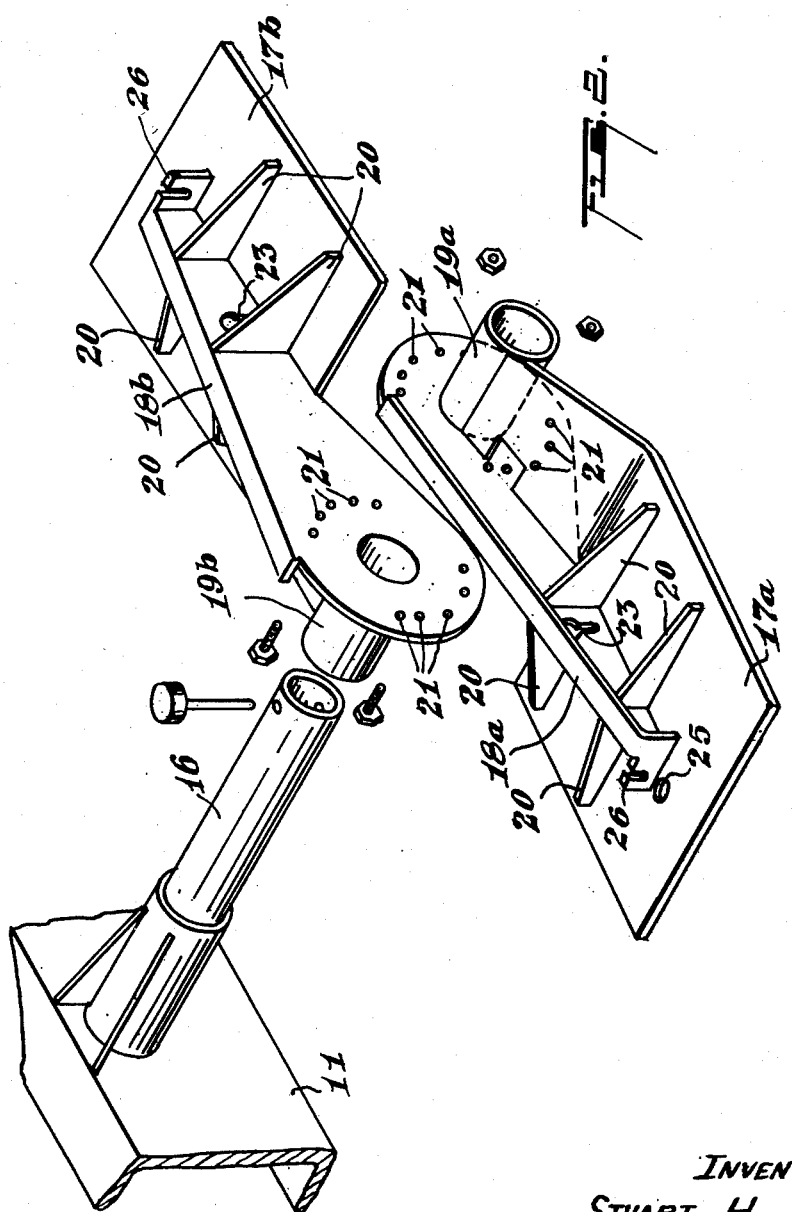

May 18, 1954 S. H. BELL 2,678,828
TILT-DECREASING ASSEMBLY
Filed Jan. 10, 1952. 3 Sheets-Sheet 3
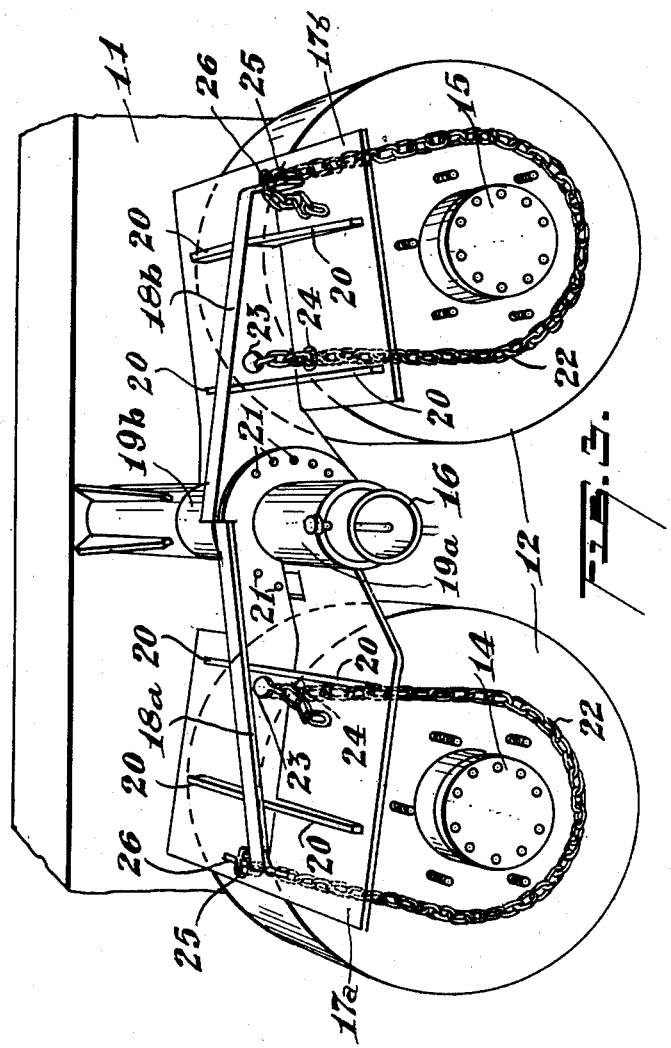
INVENTOR.
STUART H. BELL.
BY Fetherstonhaugh & Co.
ATTORNEYS.

Patented May 18, 1954

2,678,828

UNITED STATES PATENT OFFICE 2,678,828

TILT-DECREASING ASSEMBLY

Stuart H. Bell, Perth, Ontario, Canada

Application January 10, 1952, Serial No. 265,818

Claims priority, application Canada
December 12, 1951

6 Claims. (Cl. 280—6)

The present invention relates to a tilt-decreasing assembly for a lifting mechanism mounted on a truck frame. While the invention was originally particularly designed for, and has been successfully applied in practice to, trucks which carry power shovels, it is equally applicable to trucks which carry a hoist, a crane, or some other lifting mechanism. In any event the tilt-decreasing assembly of my invention is applied to a truck frame which is rearwardly supported by four dual wheels, namely a rearward set of dual wheels mounted on a common axle and a relatively forward set of dual wheels, also mounted on a common axle, the two axles being generally parallel to one another.

The wheels of trucks which carry lifting mechanisms are spring-suspended with respect to the truck frame, as in the case of conventional trucks, to minimize jarring of the truck when in motion. This spring-suspension of the wheels is of no disadvantage when the lifting mechanism is operated so long as the center of gravity of the lifting mechanism and its load are maintained in a plane which passes vertically through the longitudinal axis of the truck frame. However, the duties normally assigned to lifting mechanisms include use of the mechanism in positions other than the limited position described in the preceding sentence. In fact, the lifting mechanism will frequently be called upon to lift a load which is located laterally of the truck frame, or to swing a load from or to various positions at one side or other of the truck frame. When the tare weight of the lifting mechanism itself, or the gross weight of the lifting mechanism and its load, are applied laterally of the center line of the truck frame, the whole frame of the truck, including the lifting mechanism carried thereby, will tilt toward the side concerned. Where the tilt is major it is hazardous, and even dangerous and when it is minor it is disadvantageous in that it imposes limitations upon the uses to which the lifting mechanism may be put. The present invention provides an assembly for decreasing this tilt sufficiently to render it ineffective, and thus increase the maneuverability of the lifting mechanism.

I am well aware that there have been prior proposals for decreasing the tilt of lifting mechanisms. For example, J. P. Grundon in United States Patent 1,840,666 and H. L. Mitchell in his United States Patents 1,767,470 and 1,606,771. So far as I am aware, however, no one has come forward with a proposal for applying a tilt-decreasing assembly to a lifting mechanism supported by a truck frame having four spring-suspended rear dual wheels, wherein the rear suspension is of the well known type in which there is a rearward set of dual wheels mounted on a common axle and a relatively forward set of dual wheels mounted on a common axle which is generally parallel to the first-mentioned axle.

I have succeeded in devising a simple and effective tilt-decreasing assembly for use with the wheel arrangement described in the preceding paragraph. My tilt-decreasing assembly generally comprises a transverse shaft rigidly mounted in the frame of the truck intermediate the two said common axles which support the rearward end of the truck, and a pair of platforms pivotally mounted on a portion of said shaft which projects from each side of the truck frame. Each of the platforms are swingable to bear against the upper surface of one of the dual wheels when the truck is stationary, and means are provided for locking the platform in an operative position in which they bear against the wheels, and in an inoperative position in which they are out of contact with the wheels.

Preferably, each of the platforms is pivotally mounted on one of the projecting shaft portions by means of a tubular member which is concentrically rotatably mounted on the shaft, and a substantially vertical arm which is rigidly secured to the tubular member and extends generally at right angles therefrom, the platforms being rigidly secured beneath said arms and arranged at substantially right angles to the arms. Preferably a number of reinforcing members are employed to brace each platform with respect to the arm which supports it.

My preferred means for locking the platforms will now be described. A widened area is provided in each platform supporting arms in the region of the tubular member. The widened areas of each of the arms are provided with a plurality of holes which pass transversely through the arms and are arranged at spaced intervals along a circle having its center on the axis of the tubular member. When an adjacent pair of arms, i. e. the arms on one side of the frame, have been swung to the desired position and the holes in each member of the pair have been aligned, a bolt, pin, or the like, may be passed through the aligned holes to prevent further relative movement thereof.

The locking means just described is sufficient to lock the platforms in their operative position. In connection with the inoperative position, it will be realized that a further locking means will be required, since, while the two arms may not move relative to one another, they could swing as a unit to such an extent that one of the platforms would contact one of the dual wheels. The extra locking means provided for holding the platforms when raised to their inoperative position may take any one of a number of forms such as a bracket or the like which is attached to the main truck under-frame and which may be attached to one of the arms; or a flexible chain or the like which has its ends connected to the arms or to the platforms and whose central portion may be passed over a projection which extends from the truck frame (or the lifting mechanism itself) at a point intermediate and above the points of connection of the chain to the arms or platforms.

In drawings which illustrate embodiments of the invention,

Figure 1 is a perspective view showing a truck carrying a power shovel and rearwardly supported by four dual wheels in the manner described, and provided with a tilt-decreasing assembly in accordance with my invention.

Figure 2 is an exploded perspective view of the elements constituting one side of the tilt-decreasing assembly, and Figure 3 illustrates a modified embodiment of the invention in which an auxiliary means is provided for locking the tilt-decreasing assembly in the operative position.

Reference numeral 10 generally indicates a truck having a generally rectangular sub-frame 11 which is rearwardly supported by four dual wheels 12 and carries a power shovel which has been generally indicated by reference numeral 13. The four dual wheels are located at the rearward end of the sub-frame 11. There is a rearward set of dual wheels which is mounted at opposite ends of a common axle which has been labelled 14. The second set of dual wheels is mounted, relatively forwardly of the first set, at opposed ends of a common axle which has been labelled 15. The axles 14 and 15 are generally parallel to one another and extend transversely of the longitudinal axis of the sub-frame 11. The sub-frame is spring-suspended with respect to the two axles 14 and 15. The arrangement described so far with reference to the drawings is quite conventional and has not, therefore, been described in detail.

Turning now to the novel tilt-decreasing assembly which forms the subject matter of this invention, a shaft 16 transversely extends through the sub-frame 11, is rigidly connected thereto, and projects on each side thereof. Shaft 16 is of circular cross-section and may be solid or tubular. A pair of platforms 17a and 17b are pivotally mounted on the portion of the shaft 16 which projects from each side of the sub-frame 11. Platforms 17a and 17b are carried by arms 18a and 18b respectively, which are in turn rigidly secured to tubular members 19a and 19b which are rotatably concentrically mounted on the projecting portion of the shaft 16. Arms 18a and 18b are substantially vertical and extend generally at right angles from the tubular members 19a and 19b to which they are secured. The platforms 17a and 17b are rigidly secured beneath the arms 18a and 18b respectively, and a plurality of reinforcing members 20 are employed to brace each platform 17 with respect to the arm 18 which supports it. Tubular members 19a and 19b extend in opposite directions from the arms 18a and 18b. With this arrangement, the arms 18a and 18b may be mounted adjacent one another with the inner face of one of the arms bearing against the outer face of the other.

It will be appreciated that with the arrangement above described it will be possible to swing the platforms to an operative position in which they bear against one of the dual wheels and to an inoperative position in which they are above and out of contact with the wheels. I have provided means for locking the platforms in their operative and inoperative position. My preferred locking means will now be described. The arms 18a and 18b are widened in the region of the tubular members 19a and 19b. The widened area of each arm is provided with a plurality of holes 21 which pass transversely through the arms and are arranged at spaced intervals along an imaginary circle having its center at the axis of the tubular member. Once the platforms carried by the arms 18a and 18b have been swung either to their operative or inoperative positions, and the holes 21 of arm 18a aligned with those of arm 18b, one or more bolts or pins may be passed through an aligned pair of holes 21. I prefer to employ a bolt having a threaded end, rather than a simple pin, as the actual locking element. Where a bolt having a threaded end is employed, a nut may be threaded on the bolt to secure the bolt with respect to the arms when the platforms have been locked. The arrangement which has just been described is sufficient to complete the locking of the platforms in the operative position, but is insufficient in the case of the inoperative position since, while the arms and the platforms may not move relative to one another, they may rotate as a unit with respect to the shaft 16. Therefore some suitable means must be provided for preventing such rotation. A flexible element having one end secured to the sub-frame 11 at a point substantially above the dual wheels 12 and attachable to one of the arms or platforms fulfils this requirement. Alternatively, a flexible element secured at its ends either to the platform 17a and 17b (or to opposite ends of the arms 18a and 18b) and passed over a projection extending either from the frame 11 or from the power shovel 13 at a point substantially above and intermediate the points of connection of the chain to the tilt-decreasing assembly will suffice.

An auxiliary locking means which may be used to lock each of the platforms in its operative position has been illustrated in the case of platforms 17a and 17b in Figure 3. In this figure, the outer portions of the dual wheels 12 below the platforms 17a and 17b have been removed in an effort to more clearly illustrate the auxiliary locking means. This means consists of two chains 22, each of which is secured at one of its ends to arm 18a (or 18b), as indicated at 23, and may be passed through an aperture 24 in the platform 17a (or 17b), passed under the axle, passed upwardly through aperture 25 in the platform, drawn taut, and finally once again secured to arm 18a (or 18b) as indicated at 26. It will be appreciated that two of these chains 22 may be joined to constitute the extra locking means which is passed over the projection on the frame or shovel to complete the securing of the platforms in their inoperative positions. It will, of course, be understood that, while I have only described and illustrated that portion of the tilt-decreasing assembly which appears on one side of the sub-frame 11, an exactly similar arrangement is to be found on the opposite side of the sub-frame.

It is believed that the operation of the tilt-decreasing assembly of my invention will be quite obvious to those skilled in the art. The truck carrying the lifting mechanism will be driven to the work site with the platforms 17a and 17b raised and out of contact with the dual wheels 12. On arrival at the point where the shovel is to be operated, with the power shovel 13 longitudinally aligned above the sub-frame 11, the platforms 17a and 17b are unlocked from their inoperative positions, whereupon each platform will fall and contact the upper surface of one of the dual wheels 12. The platforms are then locked in this position by pressing bolts or pins through aligned pairs of holes 21 in the adjacent pairs of arms 18a and 18b on both sides of the sub-frame 11; whereafter, if desired, the auxiliary locking means (chains 22) may also be applied. Once the platforms have been locked in the operative position, the power shovel may be swung to excavate and/or carry loads on either side of the center line of the truck frame 11 without any appreciable tilting of the frame 11 and shovel 13. The tilting which would normally occur due to the spring-suspension of the wheels 12 is ruled out since, as soon as an uneven load is developed on one side of the frame, which load would normally unevenly compress the springs on that side and produce a tilt in that direction, the tilt-decreasing assembly of my invention transfers the said uneven load along shaft 16 to arms 18a and 18b, and thence to platforms 17a and 17b and the wheels 12. The assembly may thus be viewed as a passageway wherealong excess loading may be transferred directly to the dual wheels, the excess loading, in effect, by-passing the spring-suspensions associated with the wheel-supporting axles. This decreasing of tilt results in increased maneuverability of the crane, and the safety and scope of its operation.

What I claim as my invention is:

1. A tilt-decreasing assembly for a lifting mechanism mounted on a truck frame which is rearwardly supported by four dual wheels consisting of a rearward set of dual wheels mounted on a common axle and a relatively forward set of dual wheels mounted on a common axle which is generally parallel to the first-mentioned axle; the said assembly comprising a transverse shaft rigidly mounted in said frame intermediate the said axles and projecting transversely from each side thereof, a pair of platforms pivotally mounted on each of the projecting portions of said shaft, each of said platforms being swingable to bear against one of the dual wheels, and means for locking said platforms in an operative position in which they bear against said wheels and in an inoperative position in which they are out of contact with the wheels.

2. A tilt-decreasing assembly as defined in claim 1, in which each of said platforms is mounted on the said transverse shaft by means of a tubular member which is rotatable with respect to the shaft, and a substantially vertical arm which is rigidly secured to said tubular member and extends generally at right angles therefrom, said platforms being rigidly secured beneath said arms and arranged substantially at right angles to the arms.

3. A tilt-decreasing assembly as defined in claim 2, in which a plurality of reinforcing members brace each platform with respect to the arm which supports it.

4. A tilt-decreasing assembly as defined in claim 2, in which each arm is widened in the region of the tubular member and the widened area of each arm is provided with a plurality of holes which pass transversely through the arms and are arranged at spaced intervals along a circle having its center on the axis of the tubular member, and in which said locking means for said platforms include pins which are passed through aligned holes in adjacent pairs of said arms when the platforms carried by the latter have been arranged in the desired operative or inoperative position.

5. A tilt-decreasing assembly as defined in claim 2 in which each arm is widened in the region of the tubular member and the widened area of each arm is provided with a plurality of holes which pass transversely through the arms and are arranged at spaced intervals along a circle having its center on the axis of the tubular member, in which said locking means for said platforms include bolts which are passed through aligned holes in adjacent pairs of said arms when the platforms carried by the latter have been arranged in the desired operative or inoperative position, and in which nuts are provided which may be threaded onto said bolts to secure the latter with respect to the arms when the platforms have been locked.

6. A tilt-decreasing assembly as defined in claim 2 in which each of said platforms is provided with an auxiliary means for locking it in its operative position, each of said auxiliary locking means comprising a chain which is attached to said arm and may be passed first downwardly through the platform, then around said axle, and finally upwardly through the platform, where it may again be secured to said arm.

References Cited in the file of this patent

UNITED STATES PATENTS

| Number | Name | Date |
|---|---|---|
| 1,270,377 | Chabala | June 25, 1918 |